(12) United States Patent
DeMeo et al.

(10) Patent No.: US 12,530,956 B2
(45) Date of Patent: Jan. 20, 2026

(54) LOCATION SYSTEM AND ARTICLE OF PERSONAL PROTECTIVE EQUIPMENT

(71) Applicant: 3M INNOVATIVE PROPERTIES COMPANY, St. Paul, MN (US)

(72) Inventors: Dana C. DeMeo, Matthews, NC (US); John G. Dinning, IV, Waxhaw, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 57 days.

(21) Appl. No.: 18/403,196

(22) Filed: Jan. 3, 2024

(65) Prior Publication Data
US 2024/0242587 A1    Jul. 18, 2024

Related U.S. Application Data

(60) Provisional application No. 63/479,568, filed on Jan. 12, 2023.

(51) Int. Cl.
*G08B 21/18*    (2006.01)
(52) U.S. Cl.
CPC .................... *G08B 21/18* (2013.01)
(58) Field of Classification Search
CPC .......... G06N 5/025; G06N 20/00; G06N 5/02; G06N 5/022; G06N 10/40; G06N 20/10; G06N 3/0442; G06N 3/0464; G06N 7/01; G06F 2113/14; G06F 2113/16; G06F 3/0484; G06F 30/12; G06F 30/13; G06F 30/18; G06F 30/20; G06F 30/27; G06F 40/30; G06F 3/017; G06F 3/013; G06F 3/04812; G06F 40/205; G06F 21/31; G06F 21/32; G06F 21/35; G06F 2203/0381;
(Continued)

(56) References Cited

U.S. PATENT DOCUMENTS 5,927,342 A * 7/1999 Bogut .................. F16L 11/127
138/104
7,263,379 B1    8/2007 Parkulo et al.
(Continued)

FOREIGN PATENT DOCUMENTS

CN    102104991    6/2011
CN    108679332    10/2018
(Continued)

*Primary Examiner* — Daniel Previl
(74) *Attorney, Agent, or Firm* — David B. Patchett; Jonathan V. Sry (57) ABSTRACT

A location system for locating a hose includes at least one location indicator coupled to the hose and configured to transmit an indicator signal indicative of a location of the at least one location indicator. The location system further includes a detection circuit associated with and carried by a user. The detection circuit includes a detection controller communicably coupled to the at least one location indicator. The detection controller is configured to determine a location signal based on the indicator signal. The location signal is indicative of a location of the hose relative to the user. The location system further includes an output unit carried by the user and communicably coupled to the detection controller. The output unit is configured to generate an output corresponding to the location signal. The output indicates the location of the hose relative to the user.

19 Claims, 10 Drawing Sheets

(58) Field of Classification Search
CPC .. G06F 2203/0384; G06F 3/011; G06F 3/012; G06F 3/04883; G06F 3/147; G06F 3/167; G06Q 10/0875; G06Q 10/00; G06Q 20/18; G06Q 20/20; G06Q 20/227; G06Q 20/322; G06Q 20/202; G06Q 20/204; G06Q 20/208; G06Q 20/351; G06Q 20/4014; G06Q 30/0208; G06Q 30/0213; G06Q 30/0215; G06Q 30/0238; G06V 10/235; G06V 10/44; G06V 10/17; G06V 10/267; G06V 10/82; G06V 20/10; G06V 20/176; G06V 20/20; A62C 37/50; A62C 27/00; A62C 3/0207; A62C 3/08; A62C 31/12; A62C 31/24; A62C 35/58; A62C 35/60; A62C 35/68; A62C 37/10; A62C 99/0018; A62C 99/009; A62C 33/00; A62C 37/36; H04W 4/029; H04W 4/90; H04W 4/02; H04W 4/024; H04W 4/025; H04W 4/14; H04W 4/38; H04W 12/06; H04W 12/08; H04W 12/68; H04W 12/72; H04W 4/021; H04W 4/33; G08B 25/009; G08B 25/016; G08B 21/0461; G08B 21/12; G08B 21/182; G08B 25/10; G08B 21/0227; G08B 21/0269; G08B 21/0272; G08B 25/004; G08B 7/066; G08B 13/2417; G08B 21/02; G08B 17/00; G08B 21/0288; G08B 21/18; G08B 25/00; G08B 25/14; B25J 9/1697; B25J 9/1653; B25J 9/161; B25J 9/163; B25J 9/0009; B25J 9/1617; B25J 9/1661; B25J 9/1689; B25J 13/06; B25J 5/007; B25J 9/0084; B25J 9/08; B25J 9/16; B25J 9/1602; G01F 23/804; G01F 1/05; G01F 15/18; G01F 15/063; G07C 5/00; G07C 5/006; G07C 5/008; G07C 5/0808; G07C 5/0816; G07C 5/085; G07C 5/12; G07C 2009/00634; G07C 9/00174; G07C 9/00309; G07C 9/00563; G07C 9/00944; B60L 2210/30; B60L 2210/40; B60L 53/16; B60L 53/53; B60L 53/57; B60L 53/20; B60L 1/003; B60L 2200/44; B60L 2260/32; B60L 3/12; B60L 2250/16; B60L 58/12; B60W 2050/146; B60W 50/14; B60W 2050/0005; B60W 2050/0215; B60W 2556/45; B60W 50/0205; G05B 2219/39001; G05B 2219/40298; G05B 2219/40304; A62B 3/00; A62B 9/006; A62B 18/08; G06T 7/70; G06T 11/206; G06T 17/05; G06T 7/254; G06T 7/75; G06T 2207/10048; G06T 2207/30196; G08G 1/202; G08G 1/205; B05B 1/02; B05B 3/0417; B05B 3/06; B05B 7/0815; E06C 5/04; E06C 5/34; E06C 5/36; F21W 2111/027; F21W 2111/08

USPC ......... 340/686.5, 686.1, 686.6, 691.1, 691.3, 340/691.8, 3.1, 3.7, 5.32, 825.49, 10.5

See application file for complete search history.

(56) References Cited

U.S. PATENT DOCUMENTS

| | | | |
|---|---|---|---|
| 7,377,835 | B2 | 5/2008 | Parkulo et al. |
| 7,398,097 | B2 | 7/2008 | Parkulo |
| 7,780,123 | B1 * | 8/2010 | Bailyn ............... E04G 21/0436 |
| | | | 248/83 |
| 7,796,026 | B1 * | 9/2010 | Jorgensen ............. G06Q 10/00 |
| | | | 340/572.1 |
| 8,755,839 | B2 | 6/2014 | Parkulo et al. |
| 9,257,028 | B2 | 2/2016 | Parkulo |
| 10,129,704 | B1 | 11/2018 | Huseth et al. |
| 10,536,528 | B2 | 1/2020 | Parkulo et al. |
| 10,607,467 | B2 * | 3/2020 | Kanukurthy ....... G06Q 10/0635 |
| 11,232,702 | B2 | 1/2022 | Huseth et al. |
| 2006/0226701 | A1 * | 10/2006 | Gatz .................... F16L 11/127 |
| | | | 307/9.1 |
| 2010/0217406 | A1 * | 8/2010 | Berry, Jr. ................ G05B 15/02 |
| | | | 700/80 |
| 2017/0273533 | A1 * | 9/2017 | Cunningham ........ A47L 9/2857 |
| 2019/0124182 | A1 | 4/2019 | Kloc et al. |
| 2019/0380781 | A1 * | 12/2019 | Tsai ....................... A61B 1/267 |
| 2021/0210202 | A1 | 7/2021 | Awiszus et al. |

FOREIGN PATENT DOCUMENTS

| | | |
|---|---|---|
| CN | 111111067 | 5/2020 |
| JP | H1128257 | 2/1999 |
| KR | 10179677 | 11/2015 |

* cited by examiner

LOCATION SYSTEM AND ARTICLE OF PERSONAL PROTECTIVE EQUIPMENT

CROSS REFERENCE TO RELATED APPLICATIONS

This application claims priority from U.S. Provisional Application Ser. No. 63/479,568, filed 12 Jan. 2023, the disclosure of which is incorporated by reference in its/their entirety herein.

TECHNICAL FIELD

The present disclosure relates generally to a location system and an article of personal protective equipment (PPE), and in particular to a location system for locating a hose.

BACKGROUND

In a firefighting operation, a firefighter may search for a reference point as a guide in order to reach a relatively safe place. Typically, the firefighter may follow a hose line in a direction to reach an end of the hose line or to reach other firefighters that may need assistance dealing with fire. Further the firefighter may follow the hose line in other direction to reach the relatively safe place or to reach a location out of a firefighting location. However, in some applications, the firefighter may not be able to locate the hose line while fighting fires, especially in smoky, dark and/or dangerous environments. Therefore, there is a need of a location system that may guide a firefighter to locate a nearest hose line.

SUMMARY

In one aspect, the present disclosure provides a location system for locating a hose. The location system includes at least one location indicator coupled to the hose and configured to transmit an indicator signal indicative of a location of the at least one location indicator. The location system further includes a detection circuit associated with and carried by a user. The detection circuit includes a detection controller communicably coupled to the at least one location indicator. The detection controller is configured to determine a location signal based on the indicator signal. The location signal is indicative of a location of the hose relative to the user. The location system further includes an output unit carried by the user and communicably coupled to the detection controller. The output unit is configured to generate an output corresponding to the location signal. The output indicates the location of the hose relative to the user.

In another aspect, the present disclosure provides a location system. The location system includes a hose. The location system further includes at least one location indicator coupled to the hose and configured to transmit an indicator signal indicative of a location of the hose. The location system further includes at least one detection circuit associated with and carried by a corresponding user. Each of the at least one detection circuit includes a detection controller communicably coupled to the at least one location indicator. The detection controller of each of the at least one detection circuit is configured to determine a corresponding location signal based on the indicator signal. The corresponding location signal is indicative of a location of the corresponding user relative to the hose. The location system further includes an incident command server remote from and communicably coupled to the detection controller of the at least one detection circuit. The incident command server is configured to receive the corresponding location signal. The location system further includes an output unit communicably coupled to the incident command server and configured to generate an output corresponding to the location signal. The output indicates the location of the corresponding user relative to the hose.

In yet another aspect, the present disclosure provides an article of personal protective equipment (PPE) carried by a user. The article of PPE includes a detection circuit including a detection controller communicably coupled to at least one location indicator. The at least one location indicator is coupled to a hose remote from the article of PPE and configured to transmit an indicator signal indicative of a location of the at least one location indicator. The detection controller is configured to determine a location signal based on the indicator signal. The location signal is indicative of a location of the hose relative to the user. The article of PPE further includes an output unit communicably coupled to the detection controller. The output unit is configured to generate an output corresponding to the location signal. The output indicates the location of the hose relative to the user.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the present disclosure, the following definitions are adopted.

As recited herein, all numbers should be considered modified by the term "about". As used herein, "a," "an," "the," "at least one," and "one or more" are used interchangeably.

As used herein as a modifier to a property or attribute, the term "generally,", unless otherwise specifically defined, means that the property or attribute would be readily recognizable by a person of ordinary skill but without requiring absolute precision or a perfect match (e.g., within +/−20% for quantifiable properties).

The term "substantially," unless otherwise specifically defined, means to a high degree of approximation (e.g., within +/−10% for quantifiable properties) but again without requiring absolute precision or a perfect match.

The term "about," unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, when a first material is termed as "similar" to a second material, at least 90 weight % of the first and second materials are identical and any variation between the first and second materials comprises less than about 10 weight % of each of the first and second materials.

As used herein, "at least one of A and B" should be understood to mean "only A, only B, or both A and B".

As used herein, "communicably coupled" refers to a wireless wide area network (WWAN) (eg, one or more cellular networks), a wireless local area networks (WLANs), Bluetooth, data transfer cables, and/or the like. It may further refer to any wired and/or wireless data transfer medium, not limited to these.

As used herein, the phrase "article of personal protective equipment" or "article of PPE" refers to any article that can be worn by an individual for the purpose of preventing or decreasing personal injury or health hazard to the individual. As it is to be worn by the individual, the article of PPE is portable. Examples of the article of PPE include safety glasses, safety goggles, face shields, face masks, respirators (such as a powered air purifying respirator), earplugs, earmuffs, gloves, suits, gowns, aprons, hard hats, etc.

As used herein, the term "controller" refers to a computing device that couples to one or more other devices, e.g., peripheral devices, motion drives, actuators, etc., and which may be configured to communicate with, e.g., to control, such devices.

Articles of personal protective equipment (PPE) are commonly worn and/or implemented to minimize exposure to hazards that may cause serious workplace injuries and illnesses. The article of PPE may be worn by a user while working in areas presenting personal injury or health hazard, such as firefighting operations, or areas where air may be contaminated with toxic or hazardous substances. In the firefighting operations, a firefighter carrying the article of PPE (such as self-contained breathing apparatus) may use a hose for guidance to reach a relatively safe place. Typically, the hose may include one or more indications to guide the user (i.e., the firefighter) to reach the relatively safe place. However, in such areas, the firefighter may not be able to locate the hose due to poor visibility in a smoky, dark, and dangerous environment.

According to a first aspect, the present disclosure provides a location system for locating a hose. The location system includes at least one location indicator coupled to the hose and configured to transmit an indicator signal indicative of a location of the at least one location indicator. The location system further includes a detection circuit associated with and carried by a user. The detection circuit includes a detection controller communicably coupled to the at least one location indicator. The detection controller is configured to determine a location signal based on the indicator signal. The location signal is indicative of a location of the hose relative to the user. The location system further includes an output unit carried by the user and communicably coupled to the detection controller. The output unit is configured to generate an output corresponding to the location signal. The output indicates the location of the hose relative to the user.

By using the at least one location indicator, the location system of the first aspect of the present disclosure may allow the user to quickly locate the hose. As a result, the user may easily reach the location of the hose. In a firefighting operation, the user (i.e., a firefighter) may follow the one or more indications (directions or arrows) on the hose to reach a relatively safe place or a desired location. Moreover, couplers associated with the hose have a pre-determined asymmetrical physical shape that the firefighter can easily recognize. This helps to instruct the firefighter which direction is towards the relatively safe place or desired location. When the user is moving towards a direction, the location system may dynamically locate the hose and transmit the location signal to the user via the output unit.

According to a second aspect, the present disclosure provides another location system. The location system includes a hose. The location system further includes at least one location indicator coupled to the hose and configured to transmit an indicator signal indicative of a location of the hose. The location system further includes at least one detection circuit associated with and carried by a corresponding user. Each of the at least one detection circuit includes a detection controller communicably coupled to the at least one location indicator. The detection controller of each of the at least one detection circuit is configured to determine a corresponding location signal based on the indicator signal. The corresponding location signal is indicative of a location of the corresponding user relative to the hose. The location system further includes an incident command server remote from and communicably coupled to the detection controller of the at least one detection circuit. The incident command server is configured to receive the corresponding location signal. The location system further includes an output unit communicably coupled to the incident command server and configured to generate an output corresponding to the location signal. The output indicates the location of the corresponding user relative to the hose.

The location system of the second aspect of the present disclosure may allow the incident command server to track locations of one or more users relative to the hose. Specifically, the incident command server receives the corresponding location signal indicating the location of the corresponding user relative to the hose. For example, in a firefighting operation, when the incident command server receives the corresponding location signal, the incident command server may send some support to the users (i.e., firefighters) whose locations may be far away relative to the hose. In some examples, when the incident command server receives the corresponding location signal, the incident command server may send one or more rescue teams to the locations of the corresponding users.

Figure 1:
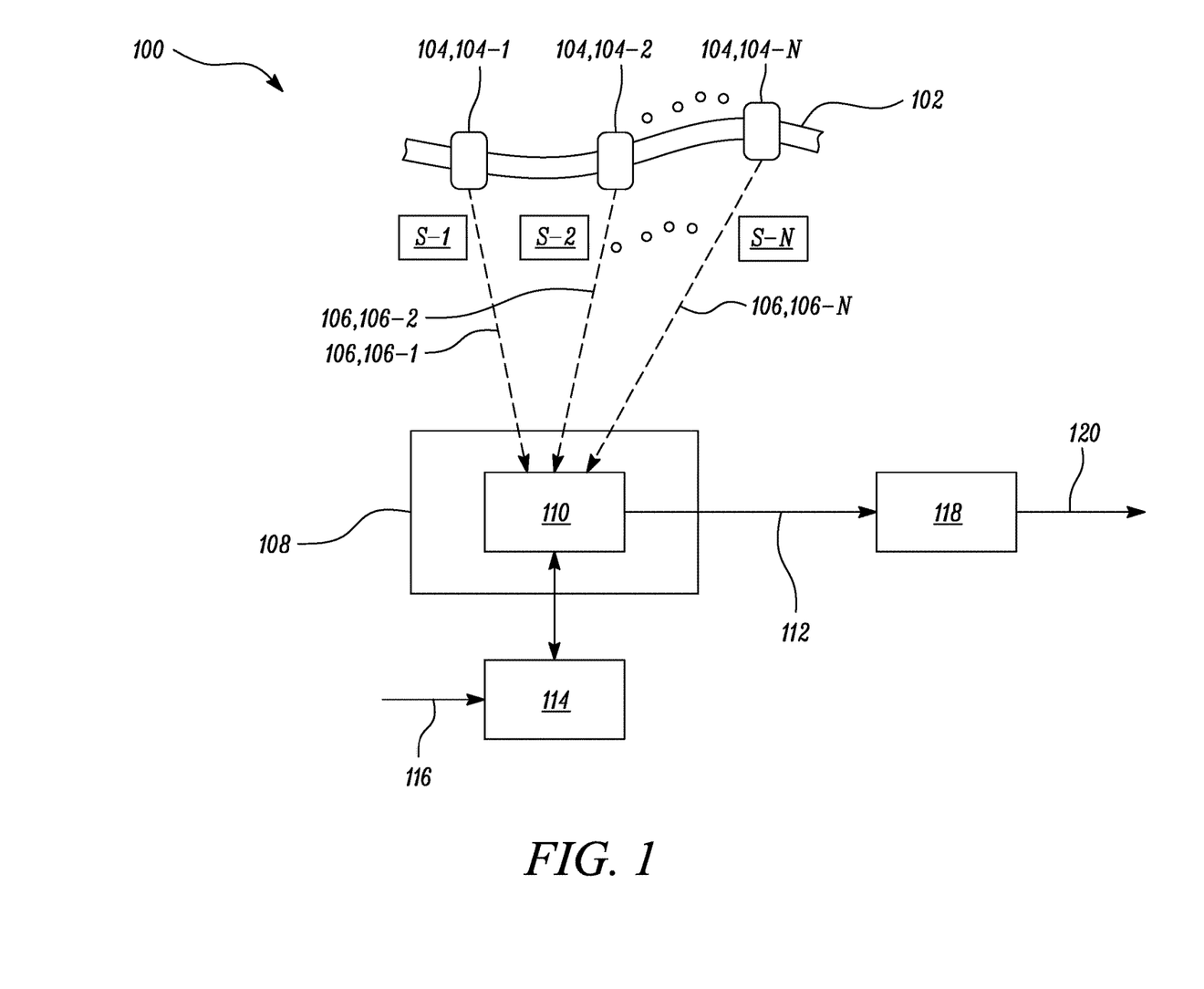
FIG. 1 is a schematic block diagram of a location system, according to an embodiment of the present disclosure.

Referring now to figures, FIG. 1 illustrates a schematic block diagram of a location system 100 for locating a hose 102. The location system 100 includes at least one location indicator 104 coupled to the hose 102 and configured to transmit an indicator signal 106 indicative of a location of the at least one location indicator 104. In some embodiments, the at least one location indicator 104 is a radio beacon, and the indicator signal 106 includes one or more radio signals. In some embodiments, the one or more radio signals includes at least one of Bluetooth signals, LoRa signals, ultrawide band signals or Zigbee signals. The radio beacon may be defined as a radio transmitting station that transmits special radio signals to a recipient in order to determine a direction or position thereof.

In the illustrated embodiment of FIG. 1, the at least one location indicator 104 includes a plurality of location indicators 104-1, 104-2 . . . , 104-N (collectively referred to as "location indicators 104") coupled to the hose 102 and spaced apart from each other along a length of the hose 102. The plurality of location indicators 104-1, 104-2 . . . , 104-N are configured to generate a corresponding plurality of indicator signals 106-1, 106-2 . . . , 106-N (collectively referred to as "indicator signals 106"). For example, the location indicator 104-1 is configured to transmit the corresponding indicator signal 106-1 indicative of a location of the location indicator 104-1. Similarly, the location indicator 104-2 is configured to transmit the corresponding indicator signal 106-2 indicative of a location of the location indicator 104-2.

The location system 100 further includes a detection circuit 108 associated with and carried by a user (not shown). The detection circuit 108 includes a detection controller 110 communicably coupled to the at least one location indicator 104. In the illustrated embodiment of FIG. 1, the detection controller 110 is communicably coupled to the plurality of location indicators 104-1, 104-2 . . . , 104-N. The detection controller 110 may include one or more processors (not shown) and one or more memories (not shown) associated with the one or more processors. The one or more processors may be any device that performs logic operations. It should be noted that the one or more processors may embody a single microprocessor or multiple microprocessors for receiving various input signals. Numerous commercially available microprocessors may be configured to perform the functions of the one or more processors. The one or more processors may further include a general processor, a central processing unit, an application specific integrated circuit (ASIC), a digital signal processor, a field programmable gate array (FPGA), a digital circuit, an analog circuit, a microcontroller, any other type of processor, or any combination thereof. The one or more processors may include one or more components that may be operable to execute computer executable instructions or computer code that may be stored and retrieved from the one or more memories.

The detection controller 110 is configured to determine a location signal 112 based on the indicator signal 106. The location signal 112 is indicative of a location of the hose 102 relative to the user. In some embodiments, the detection controller 110 is further configured to determine a plurality of signal strengths S-1, S2 . . . , S-N of the plurality of indicator signals 106-1, 106-2 . . . , 106-N. For a given signal, the signal strength refers to a transmitter power output as received by a reference antenna at a distance from a transmitting antenna. Further, the detection controller 110 is configured to determine the location signal 112 based on the plurality of signal strengths S-1, S2 . . . , S-N. Specifically, in some embodiments, computer executable instructions or computer code may be stored in the one or more memories of the detection controller 110 for determining the location signal 112 based on the plurality of signal strengths S-1, S2 . . . , S-N.

The detection controller 110 is further configured to determine a maximum signal strength from the plurality of signal strengths S-1, S2 . . . , S-N. The maximum signal strength corresponds to a representative indicator signal from the plurality of indicator signals 106-1, 106-2 . . . , 106-N. The detection controller 110 is further configured to determine the location signal 112 based on the representative indicator signal.

In some embodiments, the detection controller 110 is further configured to dynamically determine the signal strength of the representative indicator signal. In other words, the signal strength of the representative indicator signal may vary with current location of the user. The detection controller 110 is further configured to continue determining the location signal 112 based on the representative indicator signal if the signal strength of the representative indicator signal continuously increases.

The location system 100 further includes an input unit 114 configured to receive an input 116 from the user and communicably coupled to the detection controller 110. The input 116 from the user actuates the detection controller 110 to determine the location signal 112 based on the indicator signal 106 received from the at least one location indicator 104. The input unit 114 may include, but not limited to a touch screen, buttons, toggle switch, voice recognition unit, and the like.

The location system 100 further includes an output unit 118 carried by the user and communicably coupled to the detection controller 110. In some embodiments, the output unit 118 includes a display unit, a speaker, or an audio-visual unit. The output unit 118 is configured to generate an output 120 corresponding to the location signal 112. The output 120 indicates the location of the hose 102 relative to the user.

In some embodiments, the detection controller 110 is further configured to transmit the location signal 112 to the output unit 118 through a Bluetooth interface or a wired connector (not shown). In some embodiments, the output unit 118 outputs the location signal 112 through a visual notification, an audio notification, and/or an audio-visual notification. In some embodiments, the visual notification includes at least one of a numerical distance between the user and the hose 102, a relative distance between the user and the hose 102, and one or more navigation directions between the user and the hose 102. The output 120 may help the user to reach the hose 102 by providing the one or more navigation directions between the user and the hose 102.

In some examples, the output 120 may be a message that may include alpha-numeric characters, audios, videos, haptic feedbacks, or combinations thereof. In some examples, the output 120 may be an audio message depicting the directions for locating the hose 102. Further, in applications such as firefighting incidents, the hose 102 may include one or more printed indicia (not shown) to guide firefighters to a relatively safe place from a hazardous environment. Moreover, couplers (discussed later) associated with the hose 102 have a pre-determined asymmetrical physical shape that the firefighters can easily recognize. This helps to instruct the firefighters which direction is towards the relatively safe place or desired location.

Advantageously, the location system 100 may allow the user to quickly locate the hose 102 by using the at least one location indicator 104. As a result, the user may easily reach the location of the hose 102. In a firefighting operation, the user (i.e., a firefighter) may follow the one or more indications (directions or arrows, or asymmetrical physical shape of hose couplers) on the hose 102 to reach a relatively safe place or a desired location. When the user is moving towards a direction, the location system 100 may dynamically locate the hose 102 and transmit the location signal 112 to the user via the output unit 118.

Figure 2:
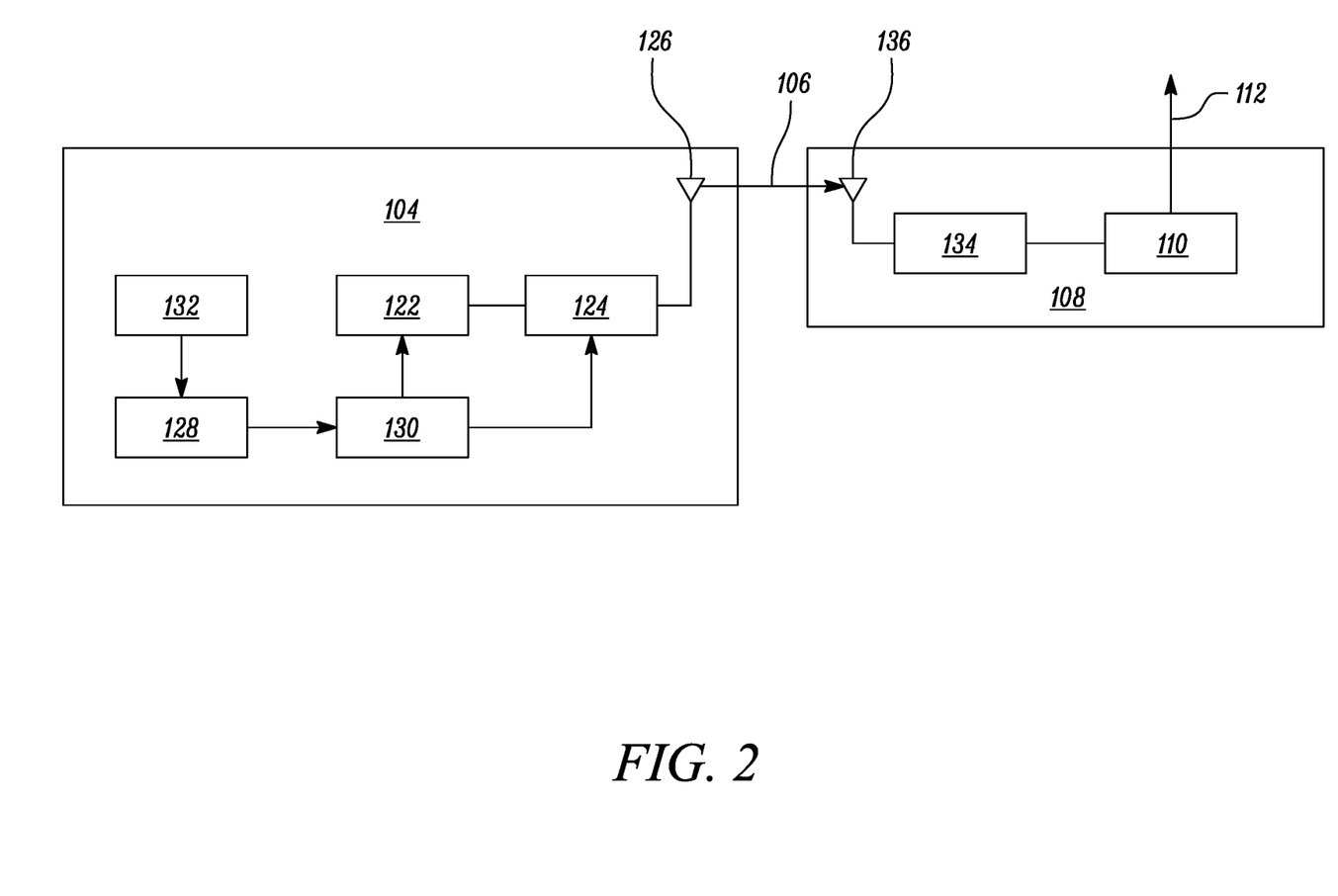
FIG. 2 is a schematic block diagram of at least one location indicator and a detection circuit of the location system of FIG. 1, according to an embodiment of the present disclosure.

FIG. 2 illustrates a schematic block diagram of the at least one location indicator 104 and the detection circuit 108, according to an embodiment of the present disclosure. In the illustrated embodiment of FIG. 2, the at least one location indicator 104 further includes an indicator controller 122, an indicator RF front end 124 communicably coupled to the indicator controller 122, and an indicator antenna 126 communicably coupled to the indicator RF front end 124 and configured to transmit the indicator signal 106. The indicator controller 122 may be a control circuit, a computer, a microprocessor, a microcomputer, a central processing unit, or any suitable device or apparatus.

The indicator RF front end 124 may also be referred to as the indicator radio frequency front end 124. The indicator RF front end 124 may include required circuitry to generate the indicator signal 106 and transmit the indicator signal 106 to the indicator antenna 126.

In some embodiments, the at least one location indicator 104 further includes an indicator power source 128 configured to electrically power one or more components of the at least one location indicator 104. The indicator power source 128 is one of a battery or an ultracapacitor. However, in some embodiments, the indicator power source 128 may include any energy storage device, such as a plurality of electrochemical cells, a battery pack, a power bank and the like. In some embodiments, the indicator power source 128 is a rechargeable power source. The at least one location indicator 104 further includes an indicator power supply circuit 130 configured to receive electric power from the indicator power source 128 and supply electric power to the one or more components of the at least one location indicator 104. For example, the indicator power supply circuit 130 may supply electric power to the indicator RF front end 124 and the indicator controller 122. In some embodiments, the at least one location indicator 104 further includes an indicator charging circuit 132 configured to charge the rechargeable power source (i.e., the indicator power source 128). The indicator charging circuit 132 is configured to charge the rechargeable power source wirelessly or through hydroelectricity.

The detection circuit 108 further includes a detection RF front end 134 communicably coupled to the detection controller 110 and a detection antenna 136 communicably coupled to the detection RF front end 134. The detection RF front end 134 may also be referred to as the detection radio frequency front end 134. Further, the detection antenna 136 is configured to receive the indicator signal 106 from the at least one location indicator 104. Specifically, the detection antenna 136 receives the indicator signal 106 from the indicator antenna 126. The detection RF front end 134 may include required circuitry to receive the indicator signal 106 from the detection antenna 136.

Figure 3:
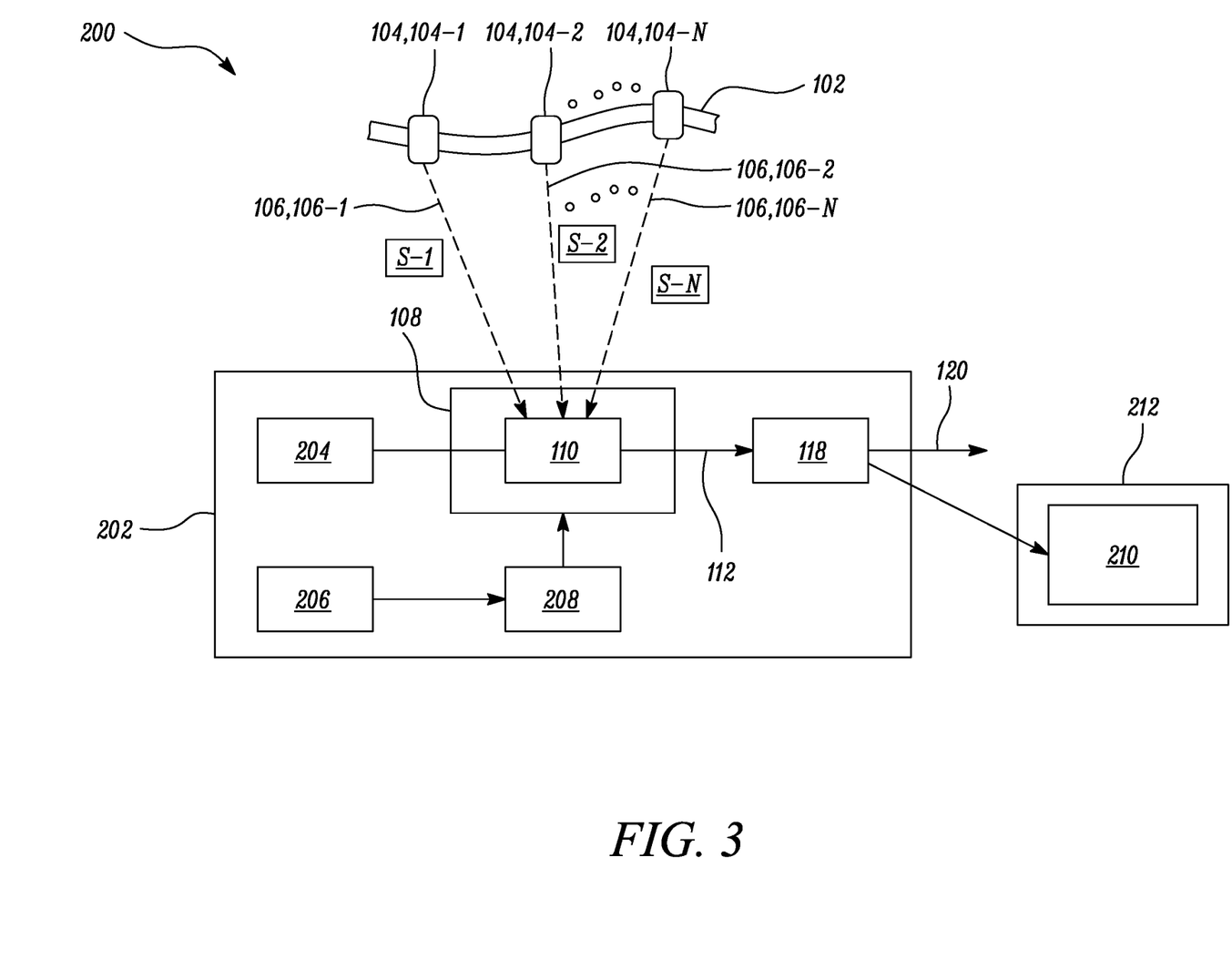
FIG. 3 is a schematic block diagram of a location system, according to another embodiment of the present disclosure.

FIG. 3 illustrates a schematic block diagram of a location system 200, according to an embodiment of the present disclosure. The location system 200 is substantially similar to the location system 100 of FIG. 1 in terms of functionality and configuration, with common components being referred to by the same numerals. However, the location system 200 further includes an article of personal protective equipment (PPE) 202 associated with the user (not shown) and/or carried by the user. Further, the article of PPE 202 includes the detection circuit 108. Moreover, the hose 102 is remote from the article of PPE 202.

The article of PPE 202 further includes an article controller 204 communicably coupled to the detection controller 110. The article controller 204 may control one or more functions of the article of PPE 202. The article of PPE 202 further includes an article power source 206. The article power source 206 may include a plurality of electrochemical cells, a battery pack, a power bank and the like. The article power source 206 may supply electric power to one or more components of the article of PPE 202. The one or more components may include, for example, an electric motor, a light source, a personal alert safety system (PASS) unit, etc. Further, the article of PPE 202 includes an article power supply circuit 208 configured to receive electric power from the article power source 206 and supply electric power to the detection circuit 108.

The article of PPE 202 further includes the output unit 118. In some embodiments, the output unit 118 is communicably coupled to a detection circuit 210 of another article of PPE 212 remote from the article of PPE 202. The article of PPE 212 and the detection circuit 210 of the article of PPE 212 may be substantially similar to the article of PPE 202 and the detection circuit 108, respectively. The article of PPE 212 may wirelessly receive the output 120 from the output unit 118. In other words, a user carrying the article of PPE 212 may receive information related to the location of the hose 102 relative to the article of PPE 202. In some examples, the article of PPE 212 may receive the location of the article of PPE 202 or the navigation directions between the articles of PPE 202, 212.

In some embodiments, the article of PPE 202 is a self-contained breathing apparatus (SCBA) or a facepiece. It should be noted that the article of PPE 202 may include any device, system, or apparatus that is worn on body of the user or carried by the user and provides protection to the user in a hazardous environment. In other words, the article of PPE 202 is portable, such that the article of PPE 202 can be worn by the user to provide protection to the user. For example, the article of PPE 202 may include respiratory protection apparatuses/devices, such as non-powered air purifying respirator (APR), a half facemask, a full facemask, a half face respirator, a full face respirator, and the like, to provide respiratory protection to the user. In another example, the article of PPE 202 may include hearing protection devices, such as earmuffs and earplugs, to provide hearing protection to the user. In another example, the article of PPE 202 may include vision protection devices, such as an eyewear, to provide vision protection to the user. In another example, the article of PPE 202 may include fall protection devices/apparatuses, such as a headgear and a harness, to provide fall protection to the user.

Figure 4:
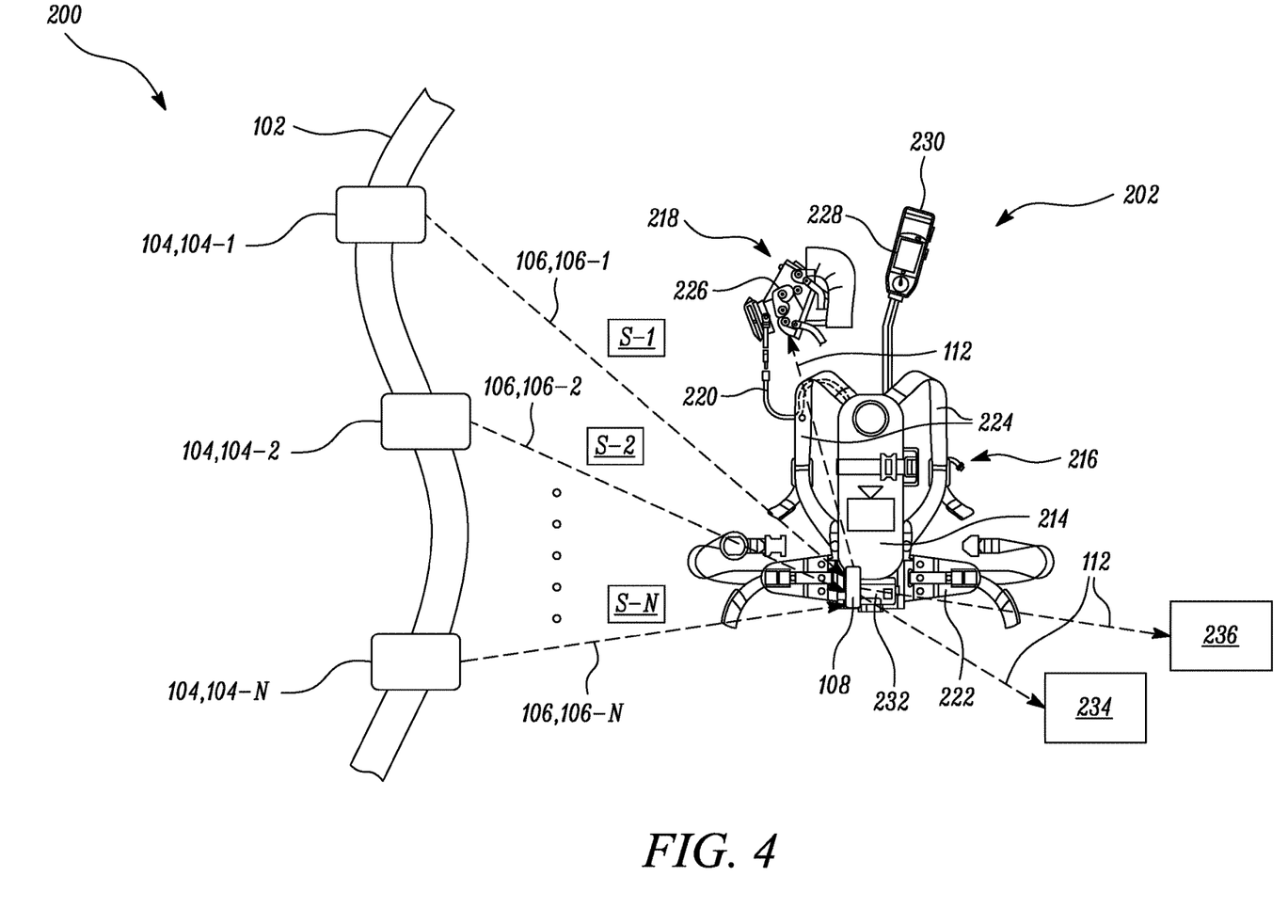
FIG. 4 is a schematic perspective view of the location system of FIG. 3, according to an exemplary embodiment of the present disclosure.
Figure 5:
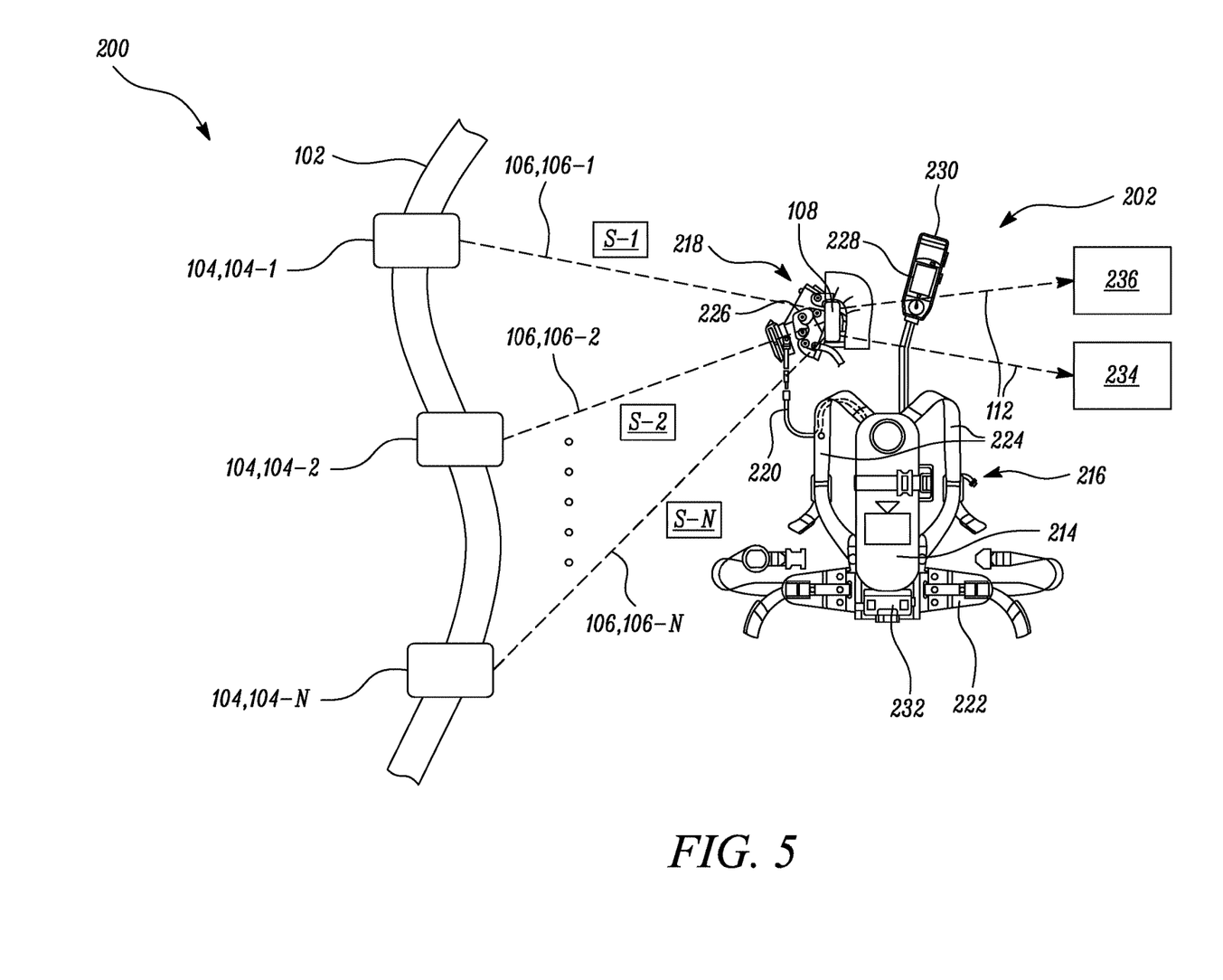
FIG. 5 is a schematic perspective view of the location system of FIG. 3, according to another exemplary embodiment of the present disclosure.

FIGS. 4 and 5 illustrate schematic perspective views of the location system 200 according to different exemplary embodiments of the present disclosure. Specifically, FIGS. 4 and 5 illustrate schematic perspective views of the hose 102 and the article of PPE 202 of the location system 200 according to the different exemplary embodiments of the present disclosure.

In the illustrated exemplary embodiments of FIGS. 4 and 5, the article of PPE 202 is a self-contained breathing apparatus (SCBA). The article of PPE 202 (i.e., the SCBA) may be carried by an emergency services worker (i.e., the user), for example, a firefighter. Specifically, the article of PPE 202 includes a collection of firefighting or safety equipment, including a high-pressure air tank 214 (hereinafter referred to as "air tank 214"), mounted on a backpack 216, as well as a headgear 218 that is worn on the user's head and connected to the air tank 214 by an air supply/data line 220. The air supply/data line 220 supplies breathable air from the air tank 214 to the user's mouth and nose. The backpack 216 includes a belt 222 and shoulder straps 224. The article of PPE 202 further includes a heads-up display (HUD) 226, a personal digital assistant (PDA) device 228, a video camera 230, and a PASS unit 232. The air supply/data line 220 may further supply power/data communications to the HUD 226.

The HUD 226 is connected to other electronic components via an electronics cable integral with the air supply/data line 220. However, the electronics cable may also be separate from the air supply/data line 220. The HUD 226 displays various information, such as an indication of an amount of air remaining in the air tank 214, instructions/information received from a command gateway (not shown) and/or from other portable devices (not shown). Information of the air tank 214 may be gathered via a pressure transducer located in an outlet pathway of the air tank 214. In some embodiments, the HUD 226 may include multiple LEDs corresponding to the air tank 214 being ¼ full, ½ full, ¾ full and completely full.

Referring to FIG. 4, the detection circuit 108 is disposed on the article of PPE 202, i.e., the SCBA. Specifically, the detection circuit 108 is disposed near to the PASS unit 232 of the article of PPE 202. Further, the detection circuit 108 may receive the indicator signal 106 from the at least one location indicator 104 and transmit the location signal 112 to the headgear 218 through a network interface (not shown). In some examples, when the location signal 112 is received by the headgear 218, the HUD 226 may display the visual notification including at least one of the numerical distance between the user and the hose 102, the relative distance between the user and the hose 102, and the one or more navigation directions between the user and the hose 102. Furthermore, the detection circuit 108 may transmit the location signal 112 to other articles of PPE 236, such as other SCBAs present in proximity of the article of PPE 202. In some examples, the detection circuit 108 may transmit the location signal 112 to an incident commander 234. In some embodiments, the incident commander 234 may subsequently transmit the location signal 112 to the other articles of PPE 236. The incident commander 234 may share the location of the article of PPE 202 to the other articles of PPE 236. In some examples, the incident commander 234 may instruct the other articles of PPE 236 to reach the location of the article of PPE 202 in order to provide support to the user carrying the article of PPE 202.

Referring to FIG. 5, the detection circuit 108 is disposed on the headgear 218 of the article of PPE 202. The detection circuit 108 is configured to receive the indicator signal 106 from the at least one location indicator 104 and determine the location signal 112 based on the indicator signal 106. The detection circuit 108 may transmit the location signal 112 to the incident commander 234. In some examples, the detection circuit 108 may transmit the corresponding location signal 112 to the other articles of PPE 236, such as other SCBAs present in proximity of the article of PPE 202.

Figure 6A:
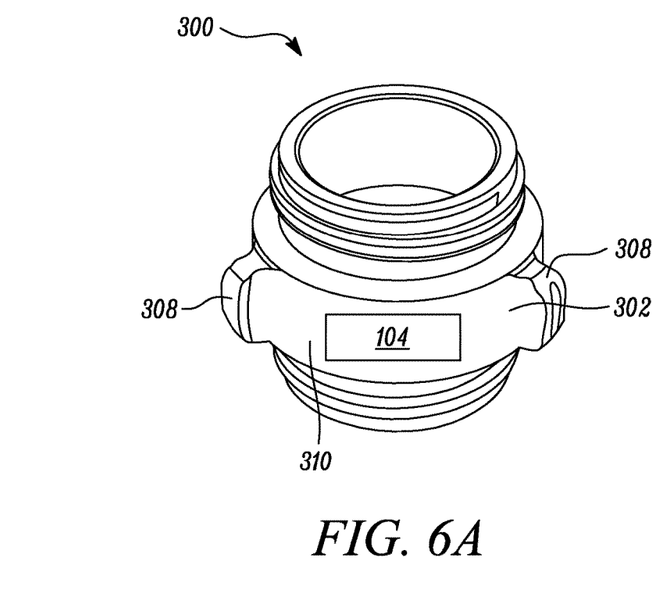
FIG. 6A is a schematic perspective view of a male hose coupler, according to an embodiment of the present disclosure.

FIG. 6A illustrates a schematic perspective view of a male hose coupler 300 (hereinafter referred to as "the coupler 300") of the hose 102 (shown in FIG. 1), according to an embodiment of the present disclosure. The coupler 300 includes a cylindrical portion 302 defining a plurality of protrusions 308 extending radially from a surface 310 of the cylindrical portion 302. In the illustrated embodiment of FIG. 6A, only two protrusions 308 from the plurality of protrusions 308 are shown for the illustrative purposes. In some examples, the plurality of protrusions 308 may be lugs. The plurality of protrusions 308 may be used to hold the coupler 300.

The at least one location indicator 104 is mounted on the coupler 300 of the hose 102 (shown in FIG. 1). Specifically, in the illustrated embodiment of FIG. 6A, the at least one location indicator 104 is mounted on the surface 310 of the cylindrical portion 302 of the coupler 300.

Figure 6B:
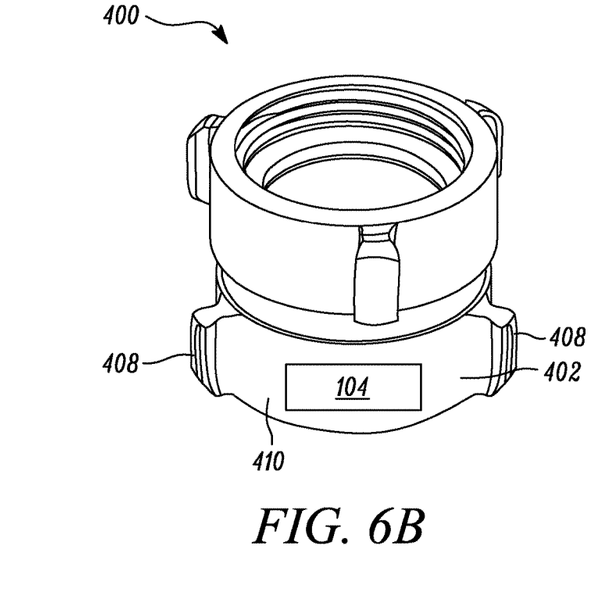
FIG. 6B is a schematic perspective view of a female hose coupler, according to an embodiment of the present disclosure.

FIG. 6B illustrates a schematic perspective view of a female hose coupler 400 (hereinafter referred to as "the coupler 400"), according to an embodiment of the present disclosure. The coupler 400 includes a cylindrical portion 402 defining a plurality of protrusions 408 extending radially from a surface 410 of the cylindrical portion 402. In the illustrated embodiment of FIG. 6B, only two protrusions 408 from the plurality of protrusions 408 are shown for the illustrative purposes. In some examples, the plurality of protrusions 408 may be lugs. The plurality of protrusions 408 may be used to hold the coupler 400.

The at least location indicator 104 is mounted on the coupler 400 of the hose 102 (shown in FIG. 1). Specifically, in the illustrated embodiment of FIG. 6B, the at least one location indicator 104 is mounted on the surface 410 of the cylindrical portion 402 of the coupler 400.

Referring to FIGS. 6A and 6B, in some examples, the male hose coupler 300 and the female hose coupler 400 may be coupled together to form a male-female hose coupler.

Figure 6C:
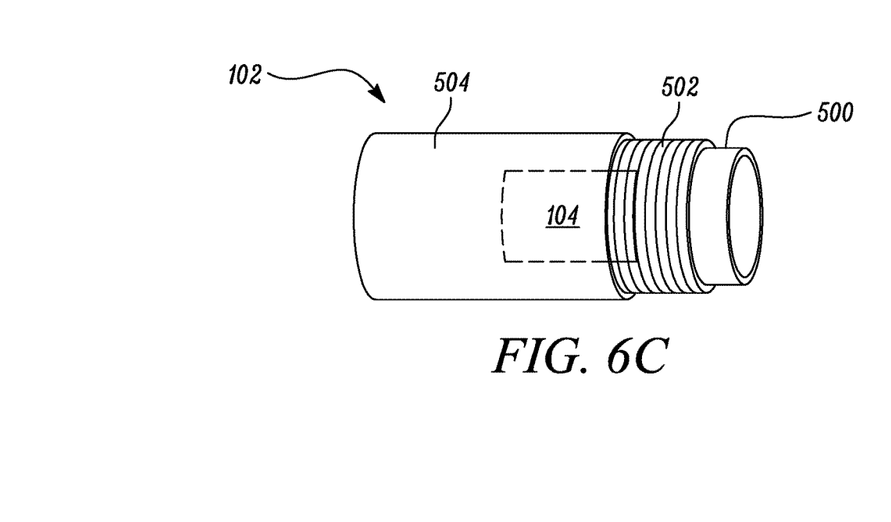
FIG. 6C is a schematic cut-away view of a portion of a hose, according to an embodiment of the present disclosure.

FIG. 6C illustrates a schematic cut-away view of the hose 102, according to an embodiment of the present disclosure. The hose 102 includes a tubular liner 500. The tubular liner 500 may be made of vulcanized rubber. The hose 102 further includes an inner woven jacket layer 502 and an outer woven jacket layer 504. In some embodiments, the at least one location indicator 104 is mounted between two woven jacket layers (i.e., between the inner woven jacket layer 502 and the outer woven jacket layer 504) of the hose 102. The inner woven jacket layer 502 and the outer woven jacket layer 504 may prevent the at least one location indicator 104 from any damage that may be caused from heat in the hazardous area.

Figure 7:
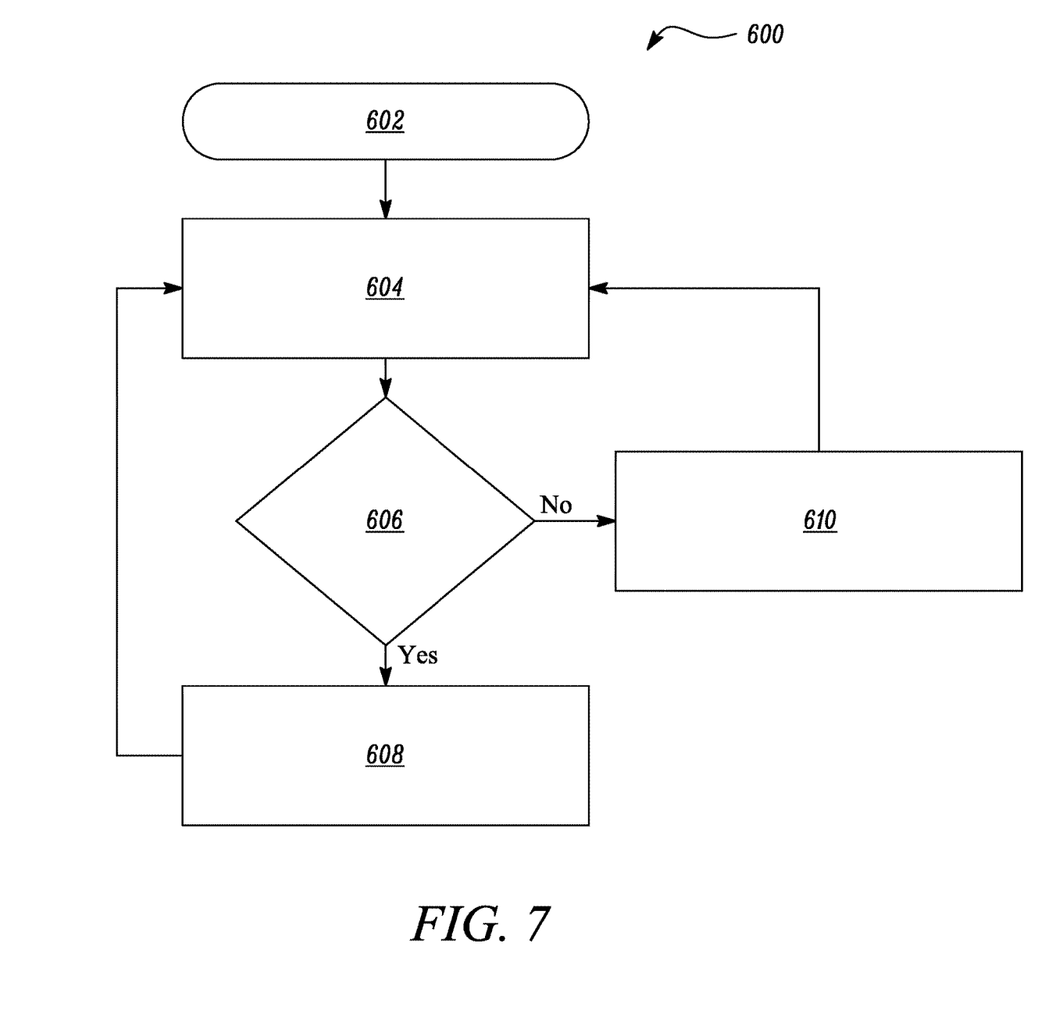
FIG. 7 is a flowchart of a process of locating a hose associated with the location system of FIG. 1, according to an embodiment of the present disclosure.

FIG. 7 illustrates a flowchart of a process 600 for locating the hose 102 (shown in FIG. 1), according to an embodiment of the present disclosure. The process 600 is embodied as a logic/algorithm implemented by the detection controller 110 and may be stored in a memory of the detection controller 110 illustrated in FIGS. 1 to 3.

With reference to FIGS. 1 and 7, at a block 602, the process 600 begins. At the block 602, the user (e.g., the firefighter) provides the input 116 to the detection controller 110 through the input unit 114. The input 116 from the user actuates the detection controller 110 to determine the location signal 112 based on the indicator signal 106 received from the at least one location indicator 104. The process 600 moves to a block 604. At the block 604, the output unit 118 instructs the user to move towards a direction of the representative indicator signal with the maximum signal strength. In other words, the output unit 118 instructs the user to move towards the direction of the maximum signal strength from the plurality of signal strengths S-1, S2 . . . , S-N.

The process 600 further moves to block 606. At the block 606, the detection controller 110 determines whether the strength of the representative indicator signal is getting stronger or not with the movement of the user. If the detection controller 110 determines that the strength of the representative indicator signal is getting stronger with the movement of the user, the process 600 further moves to a block 608. At the block 608, the output unit 118 instructs the user to continue moving in the same direction.

If the detection controller 110 determines that the strength of the representative indicator signal is not getting stronger with the movement of the user, the process 600 further moves to a block 610. At the block 610, the output unit 118 instructs the user to move in a direction different from the one that was mentioned in the block 604. From the blocks 608, 610, the process 600 moves back to the block 604 until the user reaches the location of the hose 102.

Figure 8:
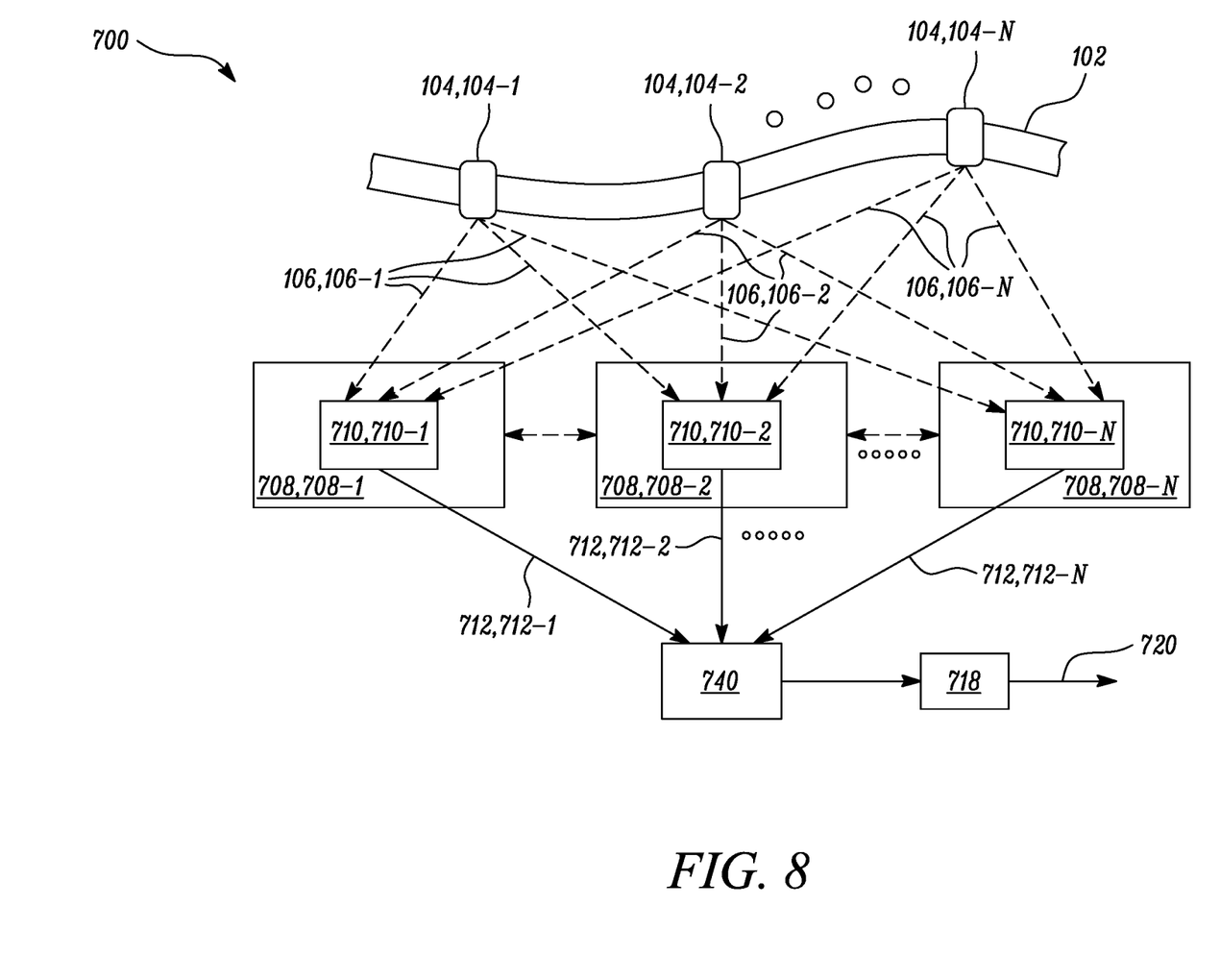
FIG. 8 is a schematic block diagram of a location system, according to yet another embodiment of the present disclosure.

FIG. 8 illustrates a schematic block diagram of a location system 700, according to an embodiment of the present disclosure. The location system 700 is substantially similar to the location system 100 of FIG. 1 in terms of functionality and configuration, with common components being referred to by the same numerals. The location system 700 includes the hose 102. However, the location system 700 includes at least one detection circuit 708 (instead of a single detection circuit 108 shown in FIG. 1) associated with and carried by a corresponding user (not shown). Each of the at least one detection circuit 708 is substantially similar and functionally equivalent to the detection circuit 108 shown in FIG. 1.

Each of the at least one detection circuit 708 includes a detection controller 710 communicably coupled to the at least one location indicator 104. The detection controller 710 of each of the at least one detection circuit 708 is substantially similar and functionally equivalent to the detection controller 110 shown in FIG. 1. The detection controller 710 of each of the at least one detection circuit 708 is configured to determine a corresponding location signal 712 based on the indicator signal 106. The corresponding location signal 712 is indicative of a location of the corresponding user relative to the hose 102.

In the illustrated embodiment of FIG. 8, the at least one detection circuit 708 includes a plurality of detection circuits 708-1, 708-2 . . . , 708-N (collectively referred to as "the detection circuits 708"). In some embodiments, at least two of the plurality of detection circuits 708-1, 708-2 . . . , 708-N are communicably coupled to each other. The plurality of detection circuits 708-1, 708-2 . . . , 708-N includes the corresponding plurality of detection controllers 710-1, 710-2 . . . , 710-N (collectively referred to as "the detection controllers 710") communicably coupled to the at least one location indicator 104. For example, the detection circuit 708-1 includes the corresponding detection controller 710-1, and the detection circuit 708-2 includes the corresponding detection controller 710-2.

Each of the plurality of detection circuits 708-1, 708-2 . . . , 708-N receives each of the plurality of indicator signals 106-1, 106-2 . . . , 106-N. Specifically, each of the corresponding plurality of detection controllers 710-1, 710-2 . . . , 710-N receives each of the plurality of indicator signals 106-1, 106-2 . . . , 106-N.

The corresponding plurality of detection controllers 710-1, 710-2 . . . , 710-N are configured to determine corresponding location signals 712-1, 712-2 . . . , 712-N (collectively referred to as "the location signals 712") based on the indicator signals 106. For example, the detection controller 710-1 is configured to determine the corresponding location signal 712-1 based on the plurality of indicator signals 106-1, 106-2 . . . 106-N, and the detection controller 710-2 is configured to determine the corresponding location signal 712-2 based on the plurality of indicator signals 106-1, 106-2 . . . , 106-N. The corresponding location signals 712-1, 712-2 . . . , 712-N are indicative of locations of the corresponding users relative to the hose 102.

The location system 700 further includes an incident command server 740 remote from and communicably coupled to the detection controller 710 of the at least one detection circuit 708. The incident command server 740 is configured to receive the corresponding location signal 712. In some embodiments, the detection controller 710 of each of the at least one detection circuit 708 is configured to transmit the corresponding location signal 712 to the incident command server 740 through at least one of the Bluetooth interface, LoRa interface, and ZigBee interface.

The location system 700 further includes an output unit 718. The output unit 718 may be substantially similar to the output unit 118 of FIG. 1 in terms of functionality and design. However, the output unit 718 is communicably coupled to the incident command server 740 and configured to generate an output 720 corresponding to the location signal 712. The output 720 indicates the location of the corresponding user relative to the hose 102.

The location system 700 of the present disclosure may allow the incident command server 740 to track the locations of the one or more users relative to the hose 102. Specifically, the incident command server 740 receives the corresponding location signal 712 indicating the location of the corresponding user relative to the hose 102. For example, in a firefighting operation, when the incident command server 740 receives the corresponding location signal 712, the incident command server 712 may send some support to the users (i.e., firefighters) whose locations may be far away relative to the hose 102. In some examples, when the incident command server 740 receives the corresponding location signal 712, the incident command server 740 may send one or more rescue teams to the locations of the corresponding users.

Figure 9:
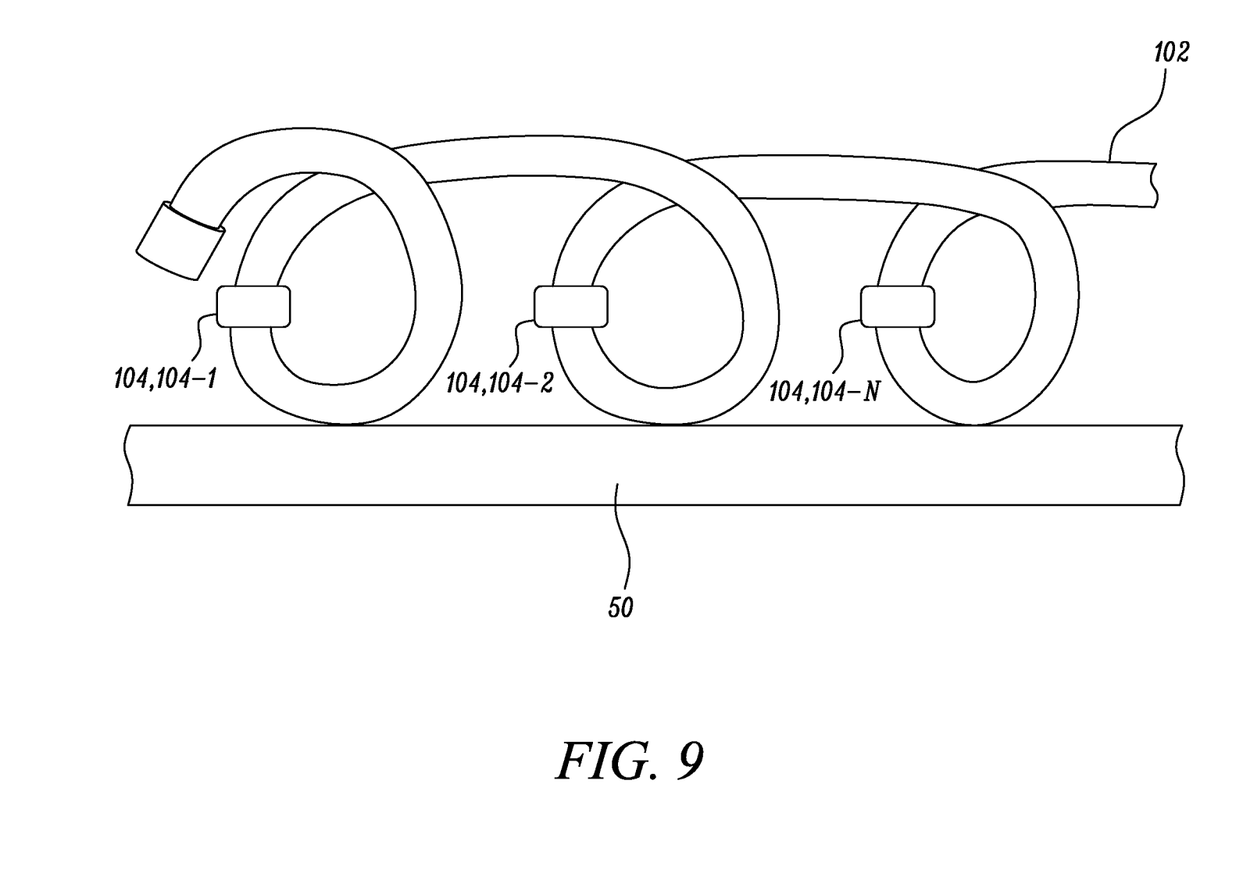
FIG. 9 is a schematic diagram of a hose of the location system of FIG. 8 and a charging mat, according to an embodiment of the present disclosure.

FIG. 9 is a schematic diagram of the hose 102 and a charging mat 50, according to an embodiment of the present disclosure. In the illustrated embodiment of FIG. 9, the hose 102 is a fire hose used in firefighting operations. The charging mat 50 is a wireless charging source to recharge the indicator power source 128 (shown in FIG. 2). Once the indicator power source 128 is recharged by the charging mat 50, the indicator power supply circuit 130 (shown in FIG. 2) receives electric power from the indicator power source 128 and supply electric power to the one or more components of the at least one location indicator 104. The charging mat 50 may be disposed underneath a hose storage compartment.

Figure 10:
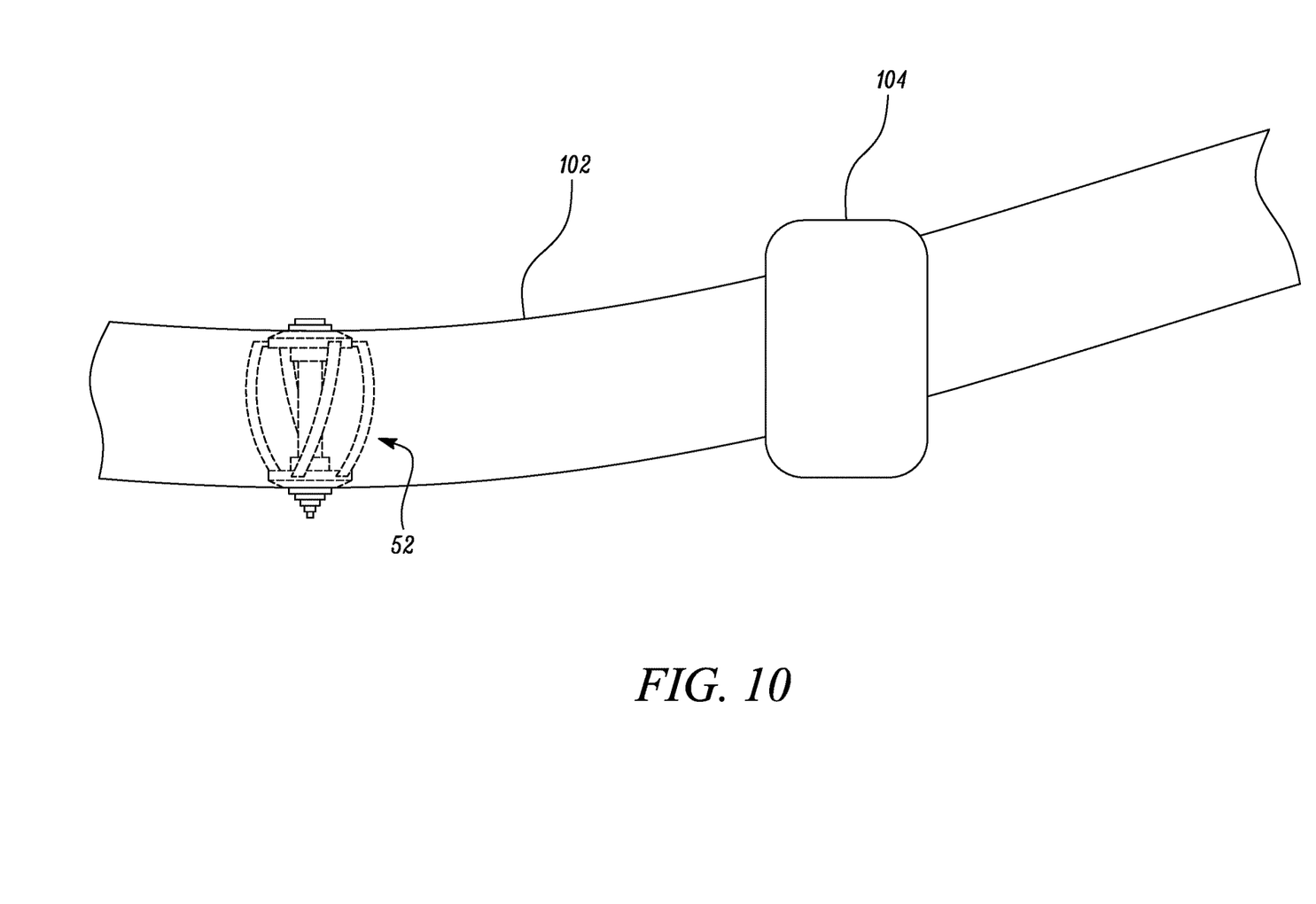
FIG. 10 is a schematic diagram of a portion of a hose of the location system of FIG. 8, according to another embodiment of the present disclosure.

FIG. 10 is a schematic diagram of a portion of the hose 102 (shown as transparent for illustrative purposes), according to another embodiment of the present disclosure. In this embodiment, the hose 102 is a fire hose and includes a turbine 52 inside the hose 102. The turbine 52 generates hydro-electric power while the water is flowing inside the hose 102 (i.e., the fire hose). The generated hydro-electric power is used to charge the indicator power source 128 (shown in FIG. 2). Only one turbine 52 is shown in FIG. 10 for illustrative purposes. In some other embodiments, the hose 102 may include two or more turbines 52.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A location system for locating a fire hose, the location system comprising:
   at least one location indicator coupled to the fire hose and configured to transmit an indicator signal indicative of a location of the at least one location indicator, wherein the at least one location indicator further comprises a plurality of location indicators coupled to the fire hose and spaced apart from each other along a length of the fire hose, wherein the plurality of location indicators are configured to generate a corresponding plurality of indicator signals;
   a detection circuit associated with and carried by a user, the detection circuit comprising a detection controller communicably coupled to the at least one location indicator, wherein the detection controller is configured to determine a location signal based on the indicator signal, wherein the location signal is indicative of a location of the fire hose relative to the user; and
   an output unit carried by the user and communicably coupled to the detection controller, wherein the output unit is configured to generate an output corresponding to the location signal, and wherein the output indicates the location of the fire hose relative to the user.

2. The location system of claim 1, wherein the detection controller is configured to transmit the location signal to the output unit through a Bluetooth interface or a wired connector.

3. The location system of claim 1, wherein the at least one location indicator is a radio beacon, and the indicator signal comprises one or more radio signals, and wherein the one or more radio signals comprises at least one of Bluetooth signals, LoRa signals, ultrawide band signals or Zigbee signals.

4. The location system of claim 1, wherein the at least one location indicator further comprises an indicator controller, an indicator RF front end communicably coupled to the indicator controller, and an indicator antenna communicably coupled to the indicator RF front end and configured to transmit the indicator signal.

5. The location system of claim 1, wherein the at least one location indicator is mounted on a coupler of the fire hose.

6. The location system of claim 1, wherein the at least one location indicator is mounted between two woven jacket layers of the fire hose.

7. The location system of claim 1, wherein the output unit comprises at least one of a display unit, a speaker, and an audio-visual unit.

8. The location system of claim 1, wherein the output unit outputs the location signal through at least one of a visual notification, an audio notification, and an audio-visual notification.

9. The location system of claim 8, wherein the visual notification comprises at least one of:
   a numerical distance between the user and the fire hose;
   a relative distance between the user and the fire hose; and
   one or more navigation directions between the user and the fire hose.

10. The location system of claim 1, further comprising an input unit configured to receive an input from the user and communicably coupled to the detection controller, wherein the input from the user actuates the detection controller to determine the location signal based on the indicator signal received from the at least one location indicator.

11. The location system of claim 1, wherein the at least one location indicator comprises an indicator power source configured to electrically power one or more components of the at least one location indicator, and wherein the indicator power source is at least one of a battery and an ultracapacitor.

12. The location system of claim 11, wherein the at least one location indicator further comprises an indicator power supply circuit configured to receive electric power from the indicator power source and supply electric power to the one or more components of the at least one location indicator.

13. The location system of claim 1, wherein the detection controller is configured to determine the location signal from only a single location indicator, wherein the location signal is indicative of a location of a hose coupler along the fire hose.

14. The location system of claim 1, wherein the detection circuit further comprises a detection RF front end communicably coupled to the detection controller and a detection antenna communicably coupled to the detection RF front end, and wherein the detection antenna is configured to receive the indicator signal from the at least one location indicator.

15. The location system of claim 1, wherein the detection controller is further configured to:
   determine a plurality of signal strengths of the plurality of indicator signals;
   determine the location signal based on the plurality of signal strengths;
   determine a maximum signal strength from the plurality of signal strengths, wherein the maximum signal strength corresponds to a representative indicator signal from the plurality of indicator signals;
   determine the location signal based on the representative indicator signal;
   dynamically determine the signal strength of the representative indicator signal; and
   continue determining the location signal based on the representative indicator signal if the signal strength of the representative indicator signal continuously increases.

16. The location system of claim 1, further comprising an article of personal protective equipment (PPE) associated with the user and comprising the detection circuit.

17. The location system of claim 16, wherein the article of PPE is a self-contained breathing apparatus (SCBA) or a facepiece.

18. The location system of claim 1 further comprising:
the fire hose;
an incident command server remote from and communicably coupled to the detection controller of the at least one detection circuit, wherein the incident command server is configured to receive the corresponding location signal; and
an output unit communicably coupled to the incident command server and configured to generate an output corresponding to the location signal, wherein the output indicates the location of the corresponding user relative to the fire hose.

19. The location system of claim 18, wherein the fire hose comprises a plurality of couplers, the plurality of couplers comprises a male hose coupler and a female hose coupler configured to connect two portions of the fire hose to each other, wherein the male hose coupler or the female hose coupler each comprise a cylindrical portion defining a plurality of protrusions extending radially from the surface of the cylindrical portion, wherein an indicator unit from the plurality of indicator units is mounted on a surface of the cylindrical portion of the male hose coupler or female hose coupler.

* * * * *